US 7,089,240 B2

(12) United States Patent
Basso et al.

(10) Patent No.: US 7,089,240 B2
(45) Date of Patent: Aug. 8, 2006

(54) LONGEST PREFIX MATCH LOOKUP USING HASH FUNCTION

(75) Inventors: Claude Basso, Raleigh, NC (US); Jean L. Calvignac, Raleigh, NC (US); Gordon T. Davis, Chapel Hill, NC (US); Piyush C. Patel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 10/879,964

(22) Filed: Jun. 29, 2004

(65) Prior Publication Data

US 2004/0236720 A1      Nov. 25, 2004

Related U.S. Application Data

(63) Continuation-in-part of application No. 09/544,992, filed on Apr. 6, 2000.

(51) Int. Cl.
   *G06F 17/30* (2006.01)
(52) U.S. Cl. ............... 707/6; 707/3; 707/5; 370/335; 370/392
(58) Field of Classification Search ............. 707/10, 707/100, 1–6; 370/230, 235, 392, 401, 383, 370/335
   See application file for complete search history.

(56) References Cited

U.S. PATENT DOCUMENTS

| 5,946,679 A * | 8/1999 | Ahuja et al. .................. 707/3 |
| 6,061,712 A | 5/2000 | Tzeng ........................ 709/202 |
| 6,070,246 A | 5/2000 | Beser ......................... 713/201 |
| 6,101,499 A | 8/2000 | Ford et al. .................... 707/10 |
| 6,173,399 B1 | 1/2001 | Gilbrech ..................... 713/153 |
| 6,212,183 B1 * | 4/2001 | Wilford ...................... 370/392 |
| 6,212,184 B1 * | 4/2001 | Venkatachary et al. ..... 370/392 |
| 6,223,172 B1 | 4/2001 | Hunter et al. ................. 707/3 |
| 6,226,710 B1 * | 5/2001 | Melchior .................... 711/108 |
| 6,226,748 B1 | 5/2001 | Bots et al. .................. 713/201 |

(Continued)

FOREIGN PATENT DOCUMENTS

WO      WO 01/04802 A1      1/2001

OTHER PUBLICATIONS

"Using multiple hash functions to improve IP lookups" by Broder et al, INFOCOM 2001, Twentieth Annual Joint Conference of the IEEE Computer and Communications Societies. Proceedings. IEEE, vol. 3, pp. 1454-1463, Apr. 22-26, 2001.

(Continued)

*Primary Examiner*—Jean Corrielus
*Assistant Examiner*—Anh Ly
(74) *Attorney, Agent, or Firm*—James A. Lucas; Driggs, Hogg & Fry Co., LPA (57) ABSTRACT

A method and apparatus are used for finding the longest prefix match in a variable length prefix search when searching a direct table within a routing table structure of a network processor. The search through the routing table structure is expedited by hashing a first segment of an internet protocol address with a virtual private network number followed by concatenating the unhashed bits of the IP address to the result of the hash operation to form an input key. Patterns are compared a bit at a time until an exact match or the best match is found. The search is conducted in a search tree that provides that the matching results will be the best possible match.

9 Claims, 7 Drawing Sheets

LPM / VPN Tree with 1-bit PSCBs

U.S. PATENT DOCUMENTS

| | | | |
|---|---|---|---|
| 6,226,751 B1 | 5/2001 | Arrow et al. | 713/201 |
| 6,308,220 B1 | 10/2001 | Mathur | 709/238 |
| 6,311,216 B1 | 10/2001 | Smith et al. | 709/226 |
| 6,338,078 B1 | 1/2002 | Chang et al. | 709/102 |
| 6,404,752 B1* | 6/2002 | Allen et al. | 370/389 |
| 6,430,184 B1 | 8/2002 | Robins et al. | 370/392 |
| 6,434,144 B1* | 8/2002 | Romanov | 370/392 |
| 6,473,846 B1* | 10/2002 | Melchior | 711/170 |
| 6,539,369 B1* | 3/2003 | Brown | 707/102 |
| 6,631,419 B1* | 10/2003 | Greene | 709/238 |
| 6,633,563 B1* | 10/2003 | Lin et al. | 370/389 |
| 6,633,880 B1* | 10/2003 | Modelski et al. | 707/100 |
| 6,640,220 B1* | 10/2003 | Firlit et al. | 707/3 |
| 6,662,184 B1* | 12/2003 | Friedberg | 707/100 |
| 6,691,218 B1* | 2/2004 | Brown | 711/216 |
| 6,715,081 B1* | 3/2004 | Attwood et al. | 707/3 |
| 6,754,832 B1* | 6/2004 | Godwin et al. | 726/14 |
| 6,778,532 B1* | 8/2004 | Akahane et al. | 370/392 |
| 6,858,455 B1* | 2/2005 | Guillom et al. | 438/20 |
| 2001/0043602 A1* | 11/2001 | Brown | 370/392 |
| 2001/0044876 A1* | 11/2001 | Brown | 711/108 |
| 2003/0126113 A1* | 7/2003 | Brown | 707/1 |

OTHER PUBLICATIONS

"Hybrid direct table and LPM searches" Research Disclosure 443117, Mar., 2001, p. 456.

* cited by examiner

| Format | Conditions | Valid in DTEntry? | Valid in PSCB? | Format (2 bits) | NPA (26 bits) | NBT (8 bits) | LCBA (26 bits) | Spare (2 bits) |
|---|---|---|---|---|---|---|---|---|
| Empty DTEntry | No leaves | Yes | Yes | 00 | 0 | 0 | 0 | 0 |
| LCBA not valid | DTEntry contains pointer to PSCB | Yes | Yes | 00 | NPA | NBT | 0 | 0 |
| LCBA valid; NPA/NBT not valid | Single leaf associated with DTEntry; LCBA contains pointer into leaf; No pointer to next PSCB | Yes | Yes | 01 | 0 | 0 | LCBA | 0 |
| LCBA valid; NPA/NBT valid | Single leaf associated with DTEntry; LCBA contains pointer to leaf; Pointer to next PSCB | Yes | Yes | 01 | NPA | NBT | LCBA | 0 |

Fig. 5 : Basic LPM Tree with 1-bit PSCBs

Fig. 6 LPM / VPN Tree with 1-bit PSCBs

Fig. 7 LPM / VPN Search Key Processing

Fig. 8 LPM/ VPN Enhanced Search Key Processing

Fig. 9

LONGEST PREFIX MATCH LOOKUP USING HASH FUNCTION

CROSS REFERENCE TO RELATED APPLICATIONS

This application is a continuation-in-part of application Ser. No. 09/544,992, filed Apr. 6, 2000, for LONGEST PREFIX MATCH (LPM) SEARCH ALGORITHM IMPLEMENTATION FOR A NETWORK PROCESSOR, and is related to application Ser. No. 09/543,531, filed Apr. 6, 2000, for FULL MATCH (FM) SEARCH ALGORITHM IMPLEMENTATION FOR A NETWORK PROCESSOR, now U.S. Pat. No. 6,675,163 B1. The subject matter of the patent and co-pending application is hereby incorporated by reference into the present description as fully as if they were represented herein in their entirety.

BACKGROUND OF THE INVENTION

1. Field of the Invention

This invention relates to computer networking structures and systems, particularly those that relate to the use of a hash function for the look up of an internet protocol (IP) address. More particularly, the invention relates to pattern matching algorithms using a longest prefix match algorithm and implemented in a network processing device.

2. Discussion of Related Art

Glossary of Terms and Abbreviations

The following terms and abbreviations shall have the meanings as set forth below unless clearly contra-indicated elsewhere in the body of the specification.

| | |
|---|---|
| ASIC | application specific integrated circuit |
| DRAM | dynamic random access memory |
| DT | direct-mapped table |
| FCB | frame control block |
| FCBA | frame control block address |
| FM | fixed match |
| Gbps | gigabit per second |
| HW | half word (i.e. 16 bits) |
| IBP | implied bit position |
| IP | internet protocol |
| IP DA | internet protocol destination address |
| LCBA | leaf control block address—pointer to a specific route entry in routing table |
| LPM | longest prefix match |
| NBT | next bit to test |
| NP | network processor |
| NPA | next pattern address (link in Patricia tree chain) |
| NPC | network processor complex |
| Patricia | Practical Algorithm to Receive Information coded in Alphanumeric |
| PSCB | pattern search control block |
| SRAM | static random access memory |
| TSE | tree search engine |
| VLAN | virtual local area network |
| VPN | virtual private network |

Network processors (NPs) are finding widespread use in rapid frame processing and forwarding capability with function flexibility through a set of embedded, programmable protocol processors and complementary system coprocessors. Network processors offer real-time processing of multiple data streams, providing enhanced security and IP packet handling and forwarding capabilities. In addition, they provide speed improvements for advanced architectures, such as parallel distributed processing and pipeline processing designs. These capabilities can enable efficient search engines, increased data handling throughput, and they provide rapid execution of complex tasks. The programmable features of network processors provide network product developers with an easier migration path to implement new protocols and technologies without the requirement of creating new ASIC designs.

Network processors provide a highly customizable, scalable technology for the development of interconnecting solutions for internet or enterprise network providers. An NP provides spaces for a wide range of solutions for low-end, stand-alone devices to large multi-rack installations. Scaling of this nature is accomplished through the use of high-performance, non-blocking packet routing switch technology and proprietary interfaces which can be adapted to other industry switch technologies.

As a programmable communications integrated circuit, the network processor provides very efficient packet classification, multi-table lookups per frame, a packet classification queue/policy management, and other packet managing capabilities. The network processor integrates a switching engine, search engine, frame processors and Ethernet MACs on one device to support the needs of users who require high capability media weight switching frames based on frame content at any protocol layer.

Hardware accelerators perform frame forwarding, frame filtering and frame alteration. The network processor's ability to enforce hundreds of rules with complex range and action specifications sets a new benchmark for filtering capabilities, making a network processor-based system uniquely suited for high capacity server farm applications.

A typical system developed with a network processor uses a distributed software model, with each programmable network processor executing tasks concurrently. Some functions are performed in a control point processor, which can be internal or external to the network processor. The control point processor provides support for layer 2 and layer 3 routing protocols, and layer 4 and layer 5 network applications and systems management. Wire speed forwarding and filtering functions are performed by a combination of the network processor hardware and resident pico code.

In communication networks, comprising a number of interconnecting nodes, data can be sent from one node to any other node or network. Specialized nodes called routers are responsible for forwarding the data to their destinations. Any data sent through a communication network contains information about the destination address, generally as part of a header. Each router compares this information, or at least part of it, with a list of addresses stored internally. If a match is found between the stored addresses and the destination address, the router establishes a path leading to the destination node. Depending on the network size and structure, the data are either forwarded directly to their destination or are sent to another intermediate router. The ISO (International Organization for Standardization) developed a routing standard that provides for a router to store routing information for partial addresses. The router then sends the packet to the best matching partial address it has in its database. This standard allows a hierarchical structure of nodes to be built using a given number of digits or given header length. Main routers are addressed by the initial part of the address, sub-routers by the middle part, and the final destination by the last digits of the address. Therefore, it is sufficient for any router to read the digits assigned to the level of the hierarchy to which the data are to be sent.

The routing of the receive packet is based on the accompanying address string. The address string is used as the search key in a database which contains the address string along with other pertinent details, such as which router is next in a delivery of a packet. The database is referred to as the routing table while the link between the current router and the next router is called the next hop in the progress of the packet. The routing table search process depends on the structure of the address as well as the organization of the tables. For example, a search key of any size less than 8 bits and having a non hierarchical structure will most efficiently be found in a routing table organized as a series of address entries. The search key would be used as an index table to locate the right entry. For a search key of a larger size, for example 32 bits, the corresponding routing table may have more than 10,000 entries. Organizing the database as a simple table to be searched directly by an index would waste a large amount of memory space, because most of the table would remain empty.

Conventional routers break up the search process into several steps. The first step is to determine whether the router is directly connected to the destination host computer. In this case, the message is one hop from the destination and should be routed in that direction. If the destination computer is not directly connected to the router, the next step is to determine the topological direction of the destination network. If the direction is determined from the topological layout, the message is routed that way. Otherwise, the final step is to route the message along a default link.

Typically, the first step is performed using a linear search to a table containing the 32 bit addresses of host computers directly connected to the router. Reflecting the local topology, each entry in the address table is connected to a corresponding output interface leading directly to the addressed computer. When a destination address is received by a router, the full 32 bits are compared with each of the destination addresses in a table. If a match is found, the message is sent directly to the corresponding destination via the specified router interface.

The second step, that of determining the direction of the destination network, is not usually performed by a linear search through a table since the number of network addresses would make such a table difficult to manage and use. In the prior art, routers. typically perform the determination using one of several well-known techniques, such as hashing, Patricia tree searching, and multilevel search. In hashing, a hash function reduces the network portion of the address, producing a small manageable index. The hashing index is used to index a hash table and to search for a matching hash entry. Corresponding to each hash entry of the hash table is the address of an output interface pointing in the topological direction of the corresponding network. If a match is found between the hash network portion and a hash entry, the message is directed toward the corresponding interface and destination network.

Hashing reduces a large, unmanageable field to a small manageable index. In the process, however, there is a chance that two or more fields may generate the same hash index. This occurrence is referred to as a collision, since these fields must be stored in the same location in the hash table. Further searching is needed to differentiate the entries during a collision. Therefore collisions reduce the efficiency obtained from using the hashing search and, in the worst case, where all permissible addresses reduce to a single index, hashing is rendered practically useless as a search process. The hash process also typically makes it difficult to distinguish among multiple prefix length table entries that all match the same search key.

Patricia tree searching avoids the collisions encountered by hashing methods. This type of search requires that all address strings and accompanying information, such as related router information, be stored in a binary tree. Starting from the most significant bit position within the address string, the search process compares the address, bit by bit, with the tree nodes. A match bit value guides the search to visit either the left or the right child node and the process is repeated for the next bit address. The search time is proportional to the size of the longest address string stored. In Patricia tree searching, the difference between the average search time and worst case search time is not significant. In addition, the routing table is organized quite efficiently. It requires less memory than comparable routing tables of hashing methods. Patricia tree searching handles the worst-case search time better than the hashing methods but, in most cases, takes significantly longer to locate a match. Therefore, many conventional routers use a combination of hashing and Patricia tree searching. This combination is called multi level searching.

Multilevel searching joins hashing with Patricia tree searching. A cache stores a hash table containing a subset of the most recently, and presumably most commonly, routed network addresses, while a Patricia tree stores the full set of network addresses. As a message is received, the destination address is hashed onto the table. If it is not located within a predetermined period of time, the address is passed to the Patricia tree search engine which insures that the address, if stored, will be found.

There are a number of known tree search algorithms including fixed match trees, longest prefix match trees, and software managed trees. Fixed match trees are used for fixed size patterns requiring an exact match, such as layer 2 Ethernet MAC tables. Longest prefix match trees are used for variable length patterns requiring only partial matches, such as IP subnet forwarding. Software managed trees are used for patterns that are defined as ranges or bit masks, such as filter rules. In general, lookup is performed with the aid of these tree search engines (TSEs).

High speed internet routers require the ability to efficiently look up internet protocol (IP) addresses. There are a variety of techniques for achieving this function, including binary search on multiple levels involving the use of multiple hashes for each input key or address. Other techniques use a cryptographic hashing function in conjunction with an IP address. Still others use a hashed radix tree method for IP route look up. Yet another approach is the use of the hashing function to generate the host identification portion of the IP address. Another method retrieves and hashes header information.

Virtual private networks (VPNs) have become popular and convenient means for protecting intra-entity communications that are transmitted over the internet. With a VPN, organizations can connect their remote branch offices, project teams, business partners and e-customers into a central network. These VPNs are fast becoming an important part of the networking infrastructure, and provide many of the benefits of a dedicated private network without the costs associated with a dedicated network. They utilize a combination of techniques for handling data packets which are being sent among members of the entity. The techniques include various combinations of compression, encryption and authentication, the rules of which may vary for members of different groups within the entity. Routers are being challenged to manage these VPNs on top of the public internet infrastructure.

U.S. Pat. No. 6,212,183 describes the use of a hash function to the first part of an IP address. Accessing routing information in a networking system uses multiple fields to characterize an input packet. It looks for a match in all fields to identify appropriate routing information. This patent depends on a hash table being large enough that there are no collisions. In other words, if 16 bits of the IP address is used as the first part, the hash table must contain $2^{16}$ entries. Alternatively, a smaller hash table can be used if a perfect hash is used that would avoid collisions. The patent does not disclose a mechanism to deal with collisions. Furthermore, no VPN functionality is mentioned.

U.S. Pat. No. 6,308,220 describes a method of accessing routing information in a networking system using the bandwidth of embedded memory to enable brute force comparison of an IP address to all entries in a routing table. However, the method of achieving access lacks the features of the present invention.

U.S. Pat. No. 6,223,172 relates to a method of accessing routing information in a networking system using an interactive process, starting with one mask length. The length of the mask is adjusted by one bit for each step. All routes of a given prefix length share a common table. However, the methodology is different than that of the present invention.

U.S. Pat. No. 6,675,163 B1 describes a full match search structure and method for finding a full match between a search pattern and a pattern stored in a leaf of a search tree.

The article entitled "Using Multiple Hash Functions to Improve IP Lookups" by A. Broder and M. Mitzenmacher appearing in IEEE INFOCOM 2001 describes the use of a hash function to a longest prefix match (LPM) routing table search. The method depends on a separate hash for each possible prefix length. The search structure is constructed to avoid collisions. It does not include VPN functionality.

Research Report n443 3-2001 #117, p. 456, describes a hybridization of a longest prefix match lookup and a fixed match lookup. It uses a hash function in the first part of an IP address and relies on the tedious step of comparing all matching entries from a hash table to resolve collisions. It does not include VPN functionality.

SUMMARY OF THE INVENTION

In view of the long search-times resulting from existing VPN routing table structures, it is an object of the current invention to provide a VPN routing table structure with search performance approaching that of a routing table structure without VPN support.

Another aspect of the subject invention is an optimization to the search engine that interprets the significant bit to test each entry in a table (hereinafter referred to as a direct table) as 16+N.

Still another aspect of the subject invention is to hash the first segment of the IP address with the VPN number. This reduces the number of PSCBs that must be processed during a search since the hash is able to better distribute the combination of the VPN/partial IP address across entries in the direct table that are not used for a direct map of the partial IP address. Note that the remaining segment of the IP address must not be hashed in order to preserve the longest prefix match characteristic required by routing tables.

These and other objects and advantages are achieved with a system and a method using hardware or a computer readable program for determining a longest prefix match for a variable length search key by a computer processing device. The method involves the acts of reading an IP destination address, reading a VPN number, and performing a hash on the N most significant bits of the IP destination address and the VPN number to form an input key. The input key is then used as an index into a table representing a plurality of root nodes of search trees wherein each non-empty entry in the table contains a pointer to a next branch in the search tree or a leaf. The table preferably contains $2^N$ entries. A determination is made as to whether the pointer in a non-empty table entry points to a leaf or to a next branch of the corresponding search tree. The next branch contents are read if the pointer does not point to the leaf of the corresponding search tree, and the prefix represented by the next branch is compared with the input key to find a distinguishing bit position. When the leaf of a corresponding search tree is reached, the leaf pattern is compared with the input key to determine if the leaf pattern matches the input key. Finally, the longest prefix match found for the input key is returned to a requesting application. The contents of the next branch of the corresponding search tree points either to another next branch or to a leaf of the corresponding search tree. The leaf may represent a partial prefix match of the input key. The search for the longest prefix match is terminated when the bit number of the next branch exceeds the length of the input key.

The invention also relates to a method of conducting a search through a virtual private network routing table structure through at least one search tree. The search involves mapping a first segment of an internet protocol destination address with a virtual private network number to form a search key and, thereafter, inputting the search key into a direct table within the routing table structure wherein the direct table represents a plurality of root nodes of search trees. Then, the longest prefix match for a variable length search key is determined. The method includes the steps required to insert or delete a route into or out of the routing table structure.

The invention also relates to an article of manufacture comprising a computer usable medium having a computer readable program embodied in said medium. The program, when executed on a computer, causes the computer to conduct a search through a virtual private network routing table structure. Utilizing the steps of hashing a first segment of an internet protocol destination address with a virtual private network number, a search is conducted through a direct table in the routing structure. If a match is not found within the table, then the key is walked through a tree search structure until the longest prefix match is achieved. The medium includes a lookup definition table that manages a tree search memory. The lookup definition table resides in a plurality of memories and comprises entries that define a physical memory that the tree resides in, a size of the key and leaf, and a type of search to be performed. A format for a direct table entry includes at least one pattern search control block; a next pattern address that points to a next pattern search control block; a leaf control block address that points to a leaf or result; a next bit or bits to test, and a direct leaf. A leaf data structure includes at least one of a leaf chaining pointer, a prefix length, a pattern to be compared to the search key, and variable user data. The direct leaf is stored directly in a direct table entry and includes a search control block and a pattern to be compared to a search key. A pattern search control block is inserted in the search tree at a position where the leaf patterns differ, and has a shape defined by a width of one and a height of one, and is stored in a memory that has a line length of at least 64 bits. Alternatively, the pattern search control block can have a shape defined by a width of one and a height of two, and is stored in a memory of at least 36 bits.

The computer readable medium contains a program product for determining a longest prefix match for a variable length search key. The product contains program instructions that read an IP destination address and a VPN number as a search string. It likewise contains program instructions that perform a hash on the N most significant bits of the IP destination address and the VPN number to form an input key. Program instructions use the N most significant bits of the input key as an index into a table representing a plurality of root nodes of search trees wherein each non-empty entry contains a pointer to a next branch in the search tree or a leaf. Program instructions determine if the pointer in a non-empty table entry points to a leaf or a next branch of the corresponding search tree. If the pointer does not point to the leaf of the corresponding search tree, the next branch contents are read and the prefix represented by the next branch is compared with the input key to find a distinguishing bit position. The program instructions read a leaf pattern when the leaf of a corresponding search tree is reached, and compare the leaf pattern with the input key to determine if the leaf pattern matches the input key. Finally, the program instructions return the longest prefix match found for the input key to the requesting application.

BRIEF DESCRIPTION OF THE DRAWINGS

The present invention will now be described with specific reference to the drawings in which.

DETAILED DISCUSSION OF THE INVENTION

The subject invention relates to hashing the first segment of the IP address with the VPN number. Note that the remaining segment of the IP address must not be hashed in order to preserve the longest prefix match characteristic required by routing tables. This reduces the number of PSCBs that must be processed during a search since the hash should better distribute the combination of the VPN/partial IP address across DT entries that are not used for a direct map of the partial IP address.

Figure 1:
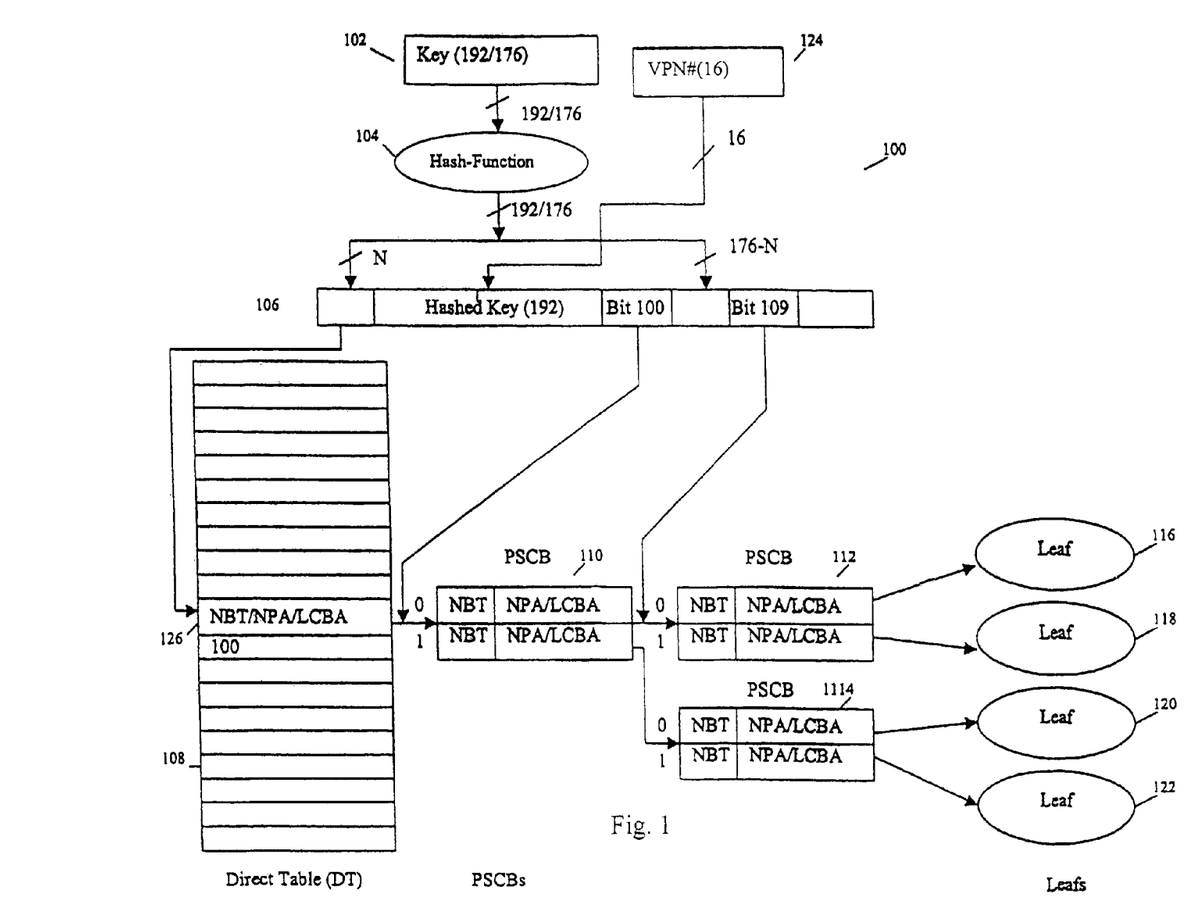
FIG. 1 illustrates a tree data structure for an exact match search algorithm wherein a VPN identification field is combined with a hashed search key.

The tree search engine (TSE) uses the concept of trees to store and retrieve information. Retrieval, i.e., tree-searches as well as inserts and deletes, are done based on a key which is a bit-pattern such as, for example, a MAC source address, or the concatenation of an IP source address and an IP destination address. An exemplary tree data structure 100 that can be modified for use in the present invention is depicted in FIG. 1. Information is stored in a control block called a leaf 116, 118, 120, 122, which contains at least the key 102 (the stored bit pattern is actually the hashed key 106). A leaf can also contain additional information, such as aging information, or user information, which can be forwarding information, such as target blade and target port numbers. The format of a leaf is defined by stored program code; the object is placed into an internal or external control store.

The search algorithm for trees operates on input parameters including the key 102, performs a hash 104 on the key, accesses a direct table (DT) 108, walks the tree through pattern search control blocks (PSCBs) 110,112, 114 and ends up at a leaf 116, 118, 120, 122. Each type of tree has its own search algorithm causing the tree-walk to occur according to different rules. For example, for longest prefix match (LPM) trees, the data structure is an extension to a Patricia tree. When a leaf has been found, this leaf is the only possible candidate that can match the input key 102. A "compare at the end" operation compares the input key 102 with the pattern stored in the leaf. This verifies if the leaf really matches the input key 102. The result of this search will be success (OK) when the leaf has been found and a match has occurred, or failure (KO) in all other cases.

The input to a search operation contains the following parameters:

Key: The 176 bit key must be built using special code instructions prior to the search or insert/delete. There is only one key register. However, after the tree search has started, the key register can be used by the code to build the key for the next search concurrently with the TSE 70 performing the search. This is because the TSE 70 hashes the key and stores the result in an internal hashed key register 106.

Key length: This 8 bit register contains the key length minus one bit. It is automatically updated by the hardware during the building of the key.

Look up definition index: This is an 8 bit index into the lookup definition table which contains a full definition of the tree in which the search occurs.

Tree search result: These results can be stored either in 1 bit tree search result areas TSR0 or TSR1. While the TSE is searching, the picocode can access the other TSR to analyze the results of a previous search.

VPN number: For trees which have VPN number enabled, the contents of a 16 bit VPN number register 124 is inserted in the key during the hash operation.

For LPM trees, the input key will be hashed into a hashed key 106. Typically, no hash function is performed on the input key for LPM trees, and the hashed output equals the input key. The hash algorithm (including no hash for LPM trees) that will be used is specified in the lookup definition table.

The lookup definition table is the main structure which manages tree search memory. The table is an internal memory structure and contains 128 entries for creating trees. The table contains entries that define the physical memory the tree exists in (e.g., DRAM, SRAM, internal RAM), whether caching is enabled, the size of the key and leaf, and the type of search action to perform. The table is implemented as three separate random access memories—one RAM that is accessible only by the general processor tree handler and two RAMs that are duplicates of each other and are accessible by all processors.

The output of the hash function 104 is a 176 bit number which has the property that there is a one-to-one correspondence between the original input key 102 and the output of the hash function 104. As will be explained below, this property minimizes the depth of the tree that starts after the direct table 108.

If the VPN numbers are enabled for the tree, the 16 bit VPN number register 124 is inserted in the 176 bit hash function output and the file result is a 192 bit number, called the hashed key 106. The insertion occurs directly after the direct table 108. If the direct table 108 contains $2^N$ entries, then the 16 bit value is inserted at bit position N. The output of the hash function, together with the inserted bit value, is stored in the hashed key register 106. If the numbers are disabled for a tree, the 176 bit hash function is taken umnodified, and 16 zeros are appended to the hash output to produce the 192 bit final hashed key.

VPN numbers can be used to share a single direct table 108 among multiple independent trees. For example, one use of a VPN number could be a VLAN ID in a MAC source address (SA) table. In this case, the input key 102 would be the MAC SA, and the VPN number 124 would be the VLAN ID (since the VLAN ID is 12 bits, four bits of the VPN number would be unused, i.e., set to zero). After the hash function 104, the pattern used is 48+16=64 bits. The VPN number is now part of the pattern and will distinguish between MAC addresses of different VLANs.

The hash function 104 is defined such that most entropy in its output resides in the highest bits. The N highest bits of the hashed key register 106 are used to calculate an index into the direct table (DT) 108.

To achieve storage as well as search efficiency, this invention makes use of the following data structures:
1. pattern/key that needs to be searched;
2. direct table (DT) entry;
3. pattern search control block (PSCB); and
4. leaf.

A DT entry is the first address location based on the first "n" bits of the key. It includes a combination of five parts. A DT entry either has a shape defined by a width of one and a height of one, or a width of one and a height of two, as described further below. A PSCB entry represents an intermediate node location. A leaf entry is the address location for the search result.

A PSCB represents a branch in the tree. In the preferred embodiment, there is an 0-branch and a 1-branch. The number of branches emanating from a PSCB is variable depending on the number of bits used to designate the branches. If n bits are used, then 2n branches are defined at that PSCB. Each PSCB is also associated with a bit position p. All leaves that can be reached from the PSCB through the 0-branch have a '0' at position p in the pattern, and the leaves that can be reached through the 1-branch have a '1' at position p. Furthermore, all leaves that can be reached from a PSCB will always have patterns at which bits 0 . . . p-1 are identical, i.e., the patterns start to differ at position p. The bit position associated with a PSCB is stored in the previous PSCB or in a DT entry and is called the NBT (i.e., next bit to test).

Thus, PSCBs are only inserted in the tree at positions where multiple leaf patterns have not yet been differentiated. This allows efficient search operations since the number of PSCBs, and thus the search performance, depends only on the number of leaves in a tree and not on the length of the patterns.

The formats for a DT and a PSCB entry are identical and include the following parts:

1. Format: 2 bits.
2. NPA (next pattern address): points to the next PSCB address.
3. LCBA (leaf control block address): points to the leaf/result.
4. NBT (next bit or bits to test) . . . can be next pair or group "x" (x=1 or n) bits to test. The number of bits to be tested is determined based on the storage efficiency, etc.

Each entry in this exemplary implementation is 36 bits wide and contains one of four possible currently defined entries.
1. Empty DT Entry: SCB=00 and NPA=0 and the LCBA/NBT are not valid, or
2. The NPA/NBT is valid but the LCBA is not valid: SCB=00 and NPA=non-zero and NBT is valid. The LCBA can be zero or non-zero. For a DT entry, NPA points to the first intermediate node and the NBT points to the bit or bits to be tested. In the case of a PSCB entry, the NPA points to other nodes in the trail.
3. The LCBA is valid and the NPA/NBT is valid: SCB=01 and NPA/NBT/LCBA is non-zero. The LCBA points to an associated leaf address, i.e., search result. The NPA points to the next PSCB address and the NBT points to the test bit or bits.
4. The LCBA is valid and the NPA/NBT is not valid: SCB=01 and NPA=zero. LCBA points to an associated leaf address, i.e., a search result. It indicates the end node.

With regard to memory allocation, LPM PSCBs have the same structure as LPM DT entries except that they always consist of two entries. These pairs or groups of addresses are allocated consecutively in memory, one of which is selected depending on whether a bit of the search key tested at the previous level of the tree is a "1" or "0".

The format of a leaf in an LPM tree contains control information including a pattern. The pattern identifies the leaf as unique in the tree. A leaf also contains the data needed by the application that initiated the tree search. The data contained in a leaf is application dependent and its size or memory requirements are defined by the lookup definition table entry for the tree.

The high level algorithm flow for the longest prefix match search is as follows:
1. Read the DT entry.
   a. if NBT>0, then read the next PSCB and store the LCBA and the previous NBT in the stack (if LCBA is present); select the first or second half of a subsequent PSCB depending on the results of testing bit NBT in the search key.
   b. if NBT=0, then read the leaf at the LCBA and go to the leaf evaluation step;
   c. if NBT is not valid and the LCBA is not present; return KO, i.e., failure for the search result and completion flag as done.
2. Repeat step 1 for each subsequent PSCB in the chain.
3. Leaf evaluation: compare the pattern (key) and the pattern stored in the leaf and compute the mismatch point.
   a. compare the value of the mismatch point with the NBT field within the stack and read the corresponding leaf (i.e., the LCBA) with the closest matching NBT and return with OK (success);
   b. if all the NBTs are greater than mismatch point, return the result with KO (failure) since no matching leaf/subnet was found.

The bit/register width values described herein are exemplary and can be changed to different values to optimize the available memories, performance requirements, etc.

The search starts with an access into the direct table 108, i.e., a DT entry is read from the direct table 108. The address used to read the DT entry is calculated from the N highest bits of the hashed key in register 106, as well as on tree-properties as defined in the lookup definition table. The DT entry can be seen as the root of a tree. The actual tree data structure depends on the tree-type. Extensions to a Patricia tree data structure are used for LPM trees.

Figure 2:
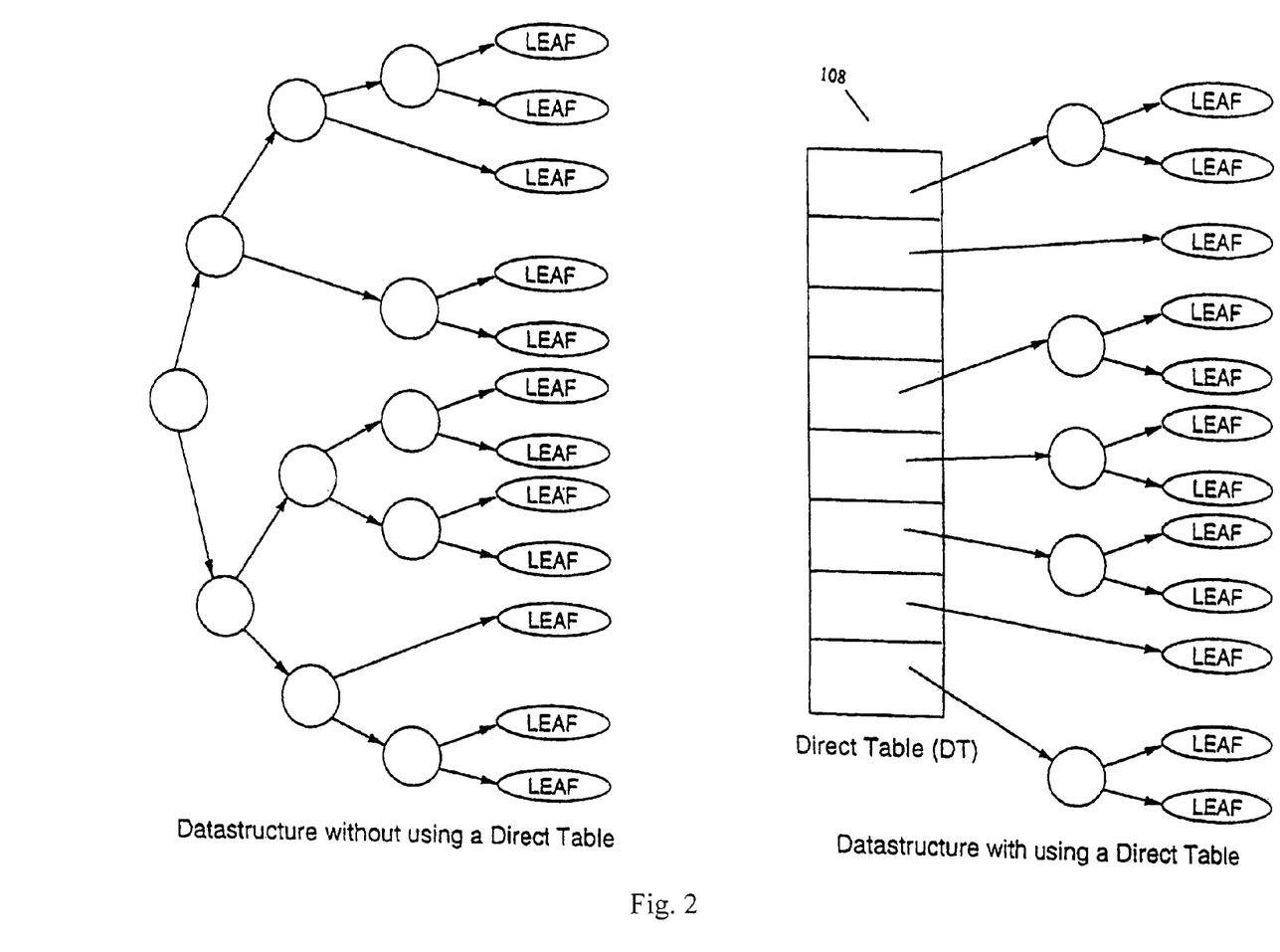
FIG. 2 illustrates the effect on exemplary data structures of using a direct table.
Figure 3:
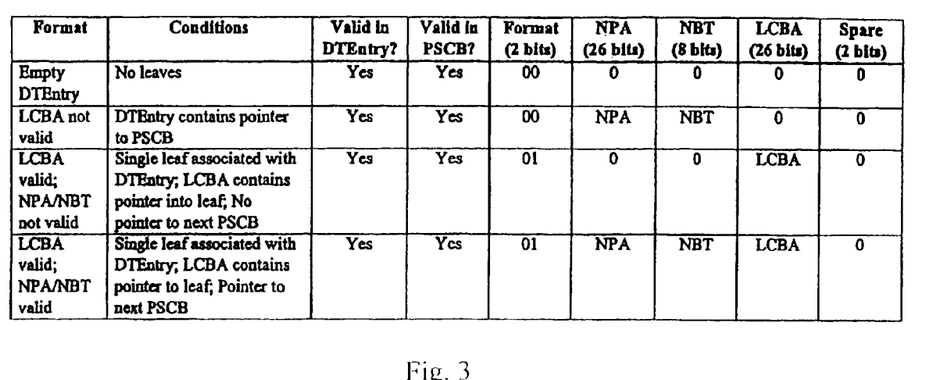
FIG. 3 illustrates an exemplary structure of a direct table entry and pattern search control block line formats in a longest prefix match search tree.
Figure 4:
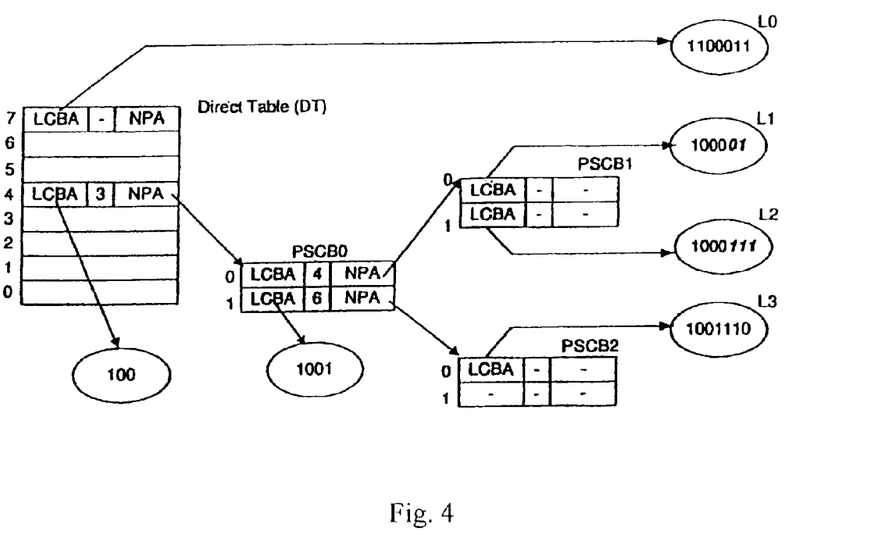
FIG. 4 illustrates a prior art example of a search using a longest prefix match search.
Figure 5:
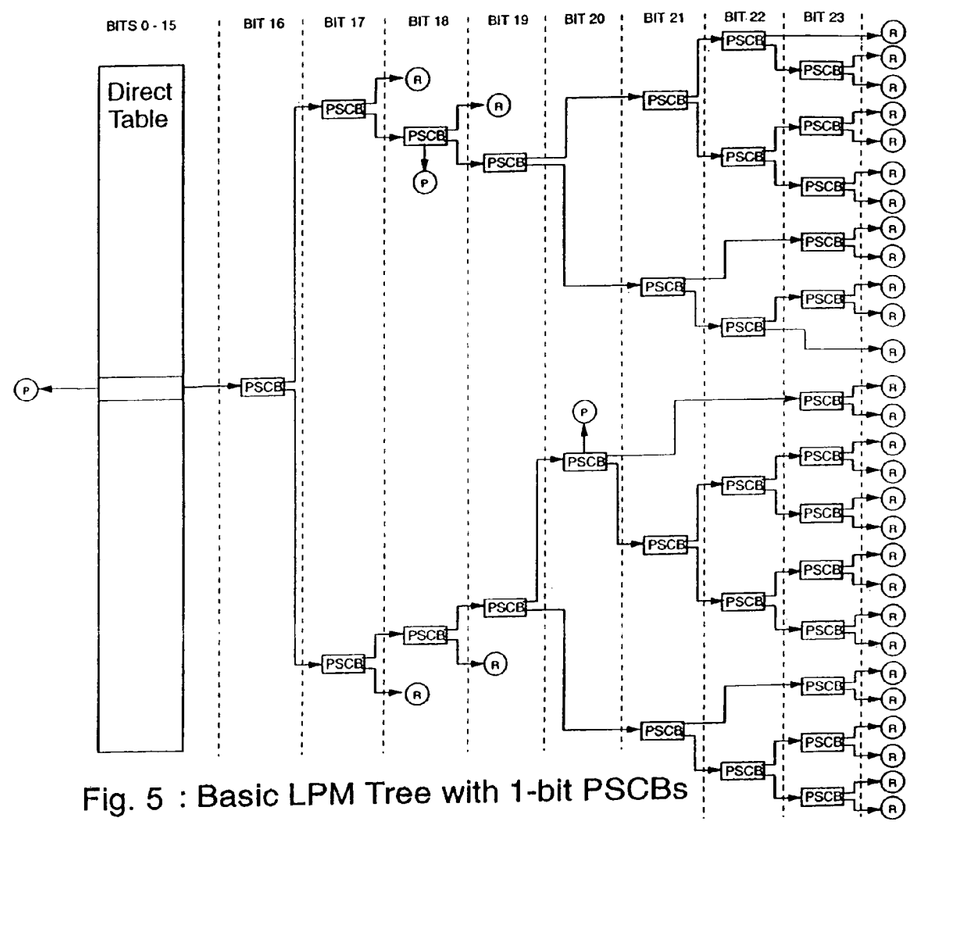
FIG. 5 is basic longest prefix match routing table structure of the prior art.

An example of the use of an eight entry DT 108 is shown in FIG. 2. It can be seen that the search time, i.e., the number of PSCBs that must be accessed, can be reduced by using a DT 108. Thus, by increasing the DT size, a trade-off can be made between memory usage and search performance.

After a DT entry has been read and assuming the DT entry does not contain a direct leaf nor is it empty, the search continues by walking the tree that starts at the DT entry. The tree-walk may pass several pattern search control blocks until a leaf has been reached.

When a PSCB is encountered during a search in an LPM tree, the tree search engine hardware will continue the tree-walk on the 0-branch or the 1-branch, depending on the value of the bit p of the Hashed key.

A lookup task using an LPM employs a library of binary patterns called prefixes, each having a length from 1 to N. A search occurs when a new pattern having a length X equal to, or greater than, N is presented. The search consists of finding the longest prefix (if any) which has all of its bits identical to the highest order bits of X. The search can be conducted in a tree structure, such as a Patricia tree, wherein one or a few bits of X are tested at each tree. Alternatively, a content addressable memory (CAM) search can be conducted using selected bits of X in one step.

Figure 6:
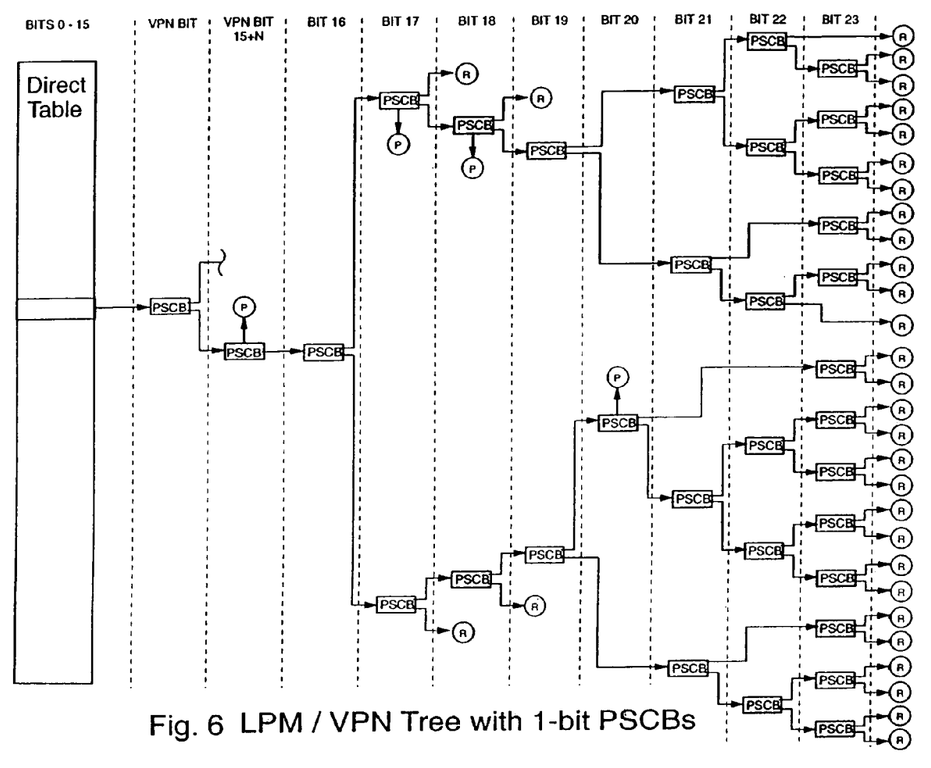
FIG. 6 is another longest prefix match routing table structure using a virtual private network.
Figure 7:
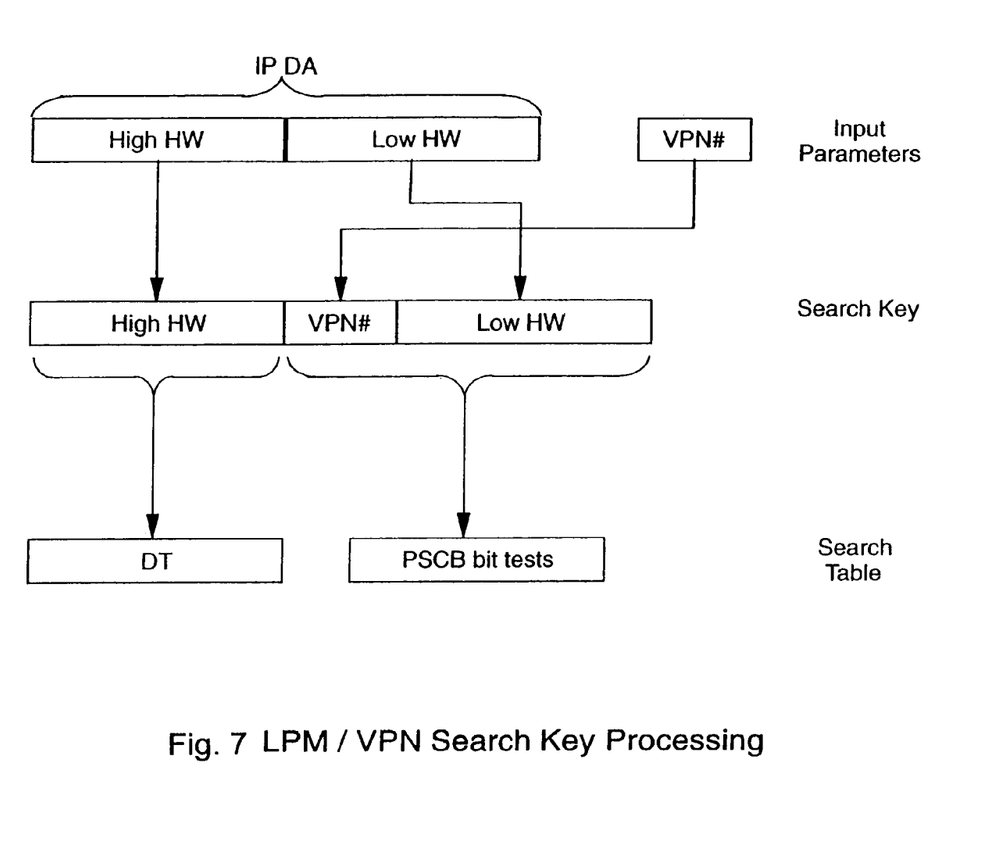
FIG. 7 shows a basic search key preparation process that is applied to the routing table of FIG. 6.

FIG. 7 illustrates a basic search key preparation process that is applied to the routing table of FIG. 6 enabling resolution of the first 16 bits of the IP address in a direct-mapped table (DT), and uses Patricia tree structures to resolve cases where multiple routes correlate to a common entry in the DT. The DT is used to resolve the first 16 bits of an IP address. Prefixes of longer prefixes (nested prefixes) are also included in this routing table structure. This routing table structure supports multiple VPNs within the same table. The VPN is identified by N bits (typically 12 bits) that must be completely resolved via additional Patricia tree decision elements or pattern search control blocks prior to resolving the second half of the IP address. Unfortunately, this approach results in longer routing table search times due to the additional PSCBs that must be resolved. Even when a single VPN correlates to a specific first 16 bits, if a 16 bit route is required in the routing table, it requires at least one PSCB to insure the VPN matches. Prefixes shorter than 16 bits are resolved in a second DT in which the VPN number is concatenated with the first few bits of the IP address, followed by chains of PSCBs to completely resolve short routes.

Figure 8:
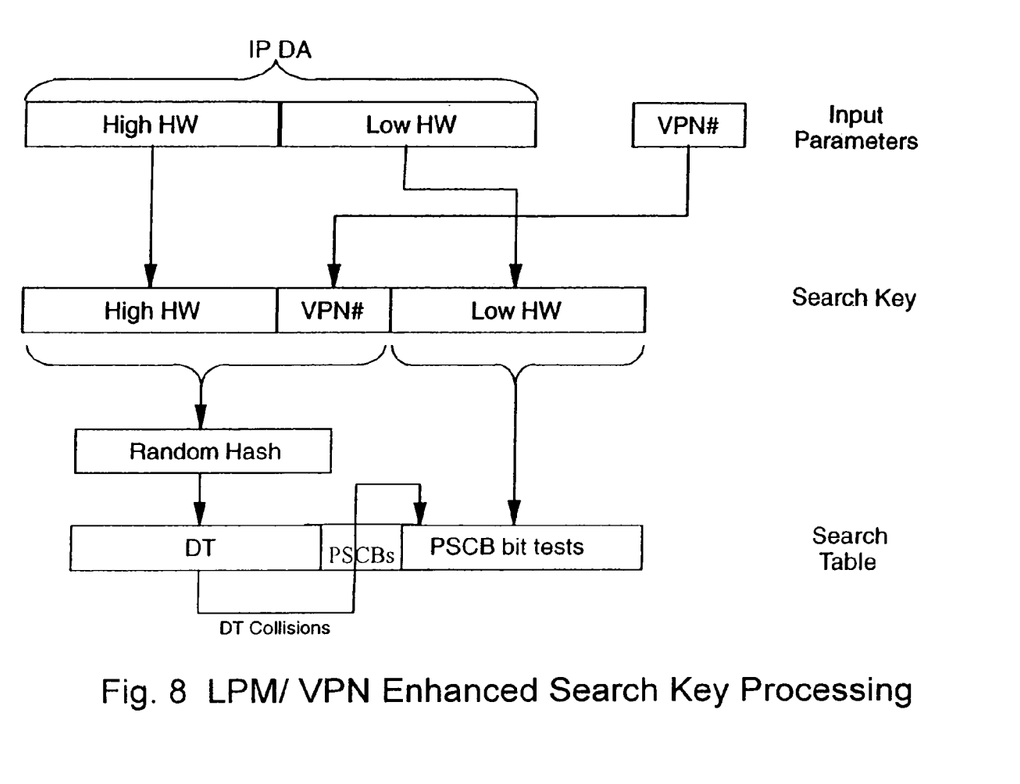
FIG. 8 illustrates an enhanced search key preparation process that is applied to the routing table of FIG. 6 in accordance with a preferred embodiment of the present invention.

The process applied to a search key in accordance with the subject invention is illustrated in FIG. 8. Yet another aspect of the subject invention is an optimization to the search engine that interprets the significant bit to test each DT entry as 16+N. This enables a single route to be connected directly to a DT entry without requiring a PSCB to define its distinguishing bit position. Likewise, this feature enables a 16 bit prefix of a longer prefix to be connected directly to a DT entry as long as all routes correlating to this DT entry are members of the same VPN. Thus, any search can be validated for this route as long as the first 16+N bits compare successfully between the search key and the pattern in the leaf. The net result is that the enhanced hashed direct table will completely resolve both the first 16 bits of the route and the VPN number, resulting in a search performance equal to that of a basic routing table illustrated in FIG. 1. There will certainly be a few DT entries that require additional PSCBs, but these cases will only result in a minor reduction in search performance. The subject invention assumes short routes are resolved using previously disclosed implementations that are beyond the scope of the subject invention.

Referring again to FIG. 8, the search key is formed exactly the same way as previously used, with the VPN number loaded as the VPN number parameter of the search. Rather than resolving the VPN number via PSCBs, the subject invention applies a random hash to the combination of the VPN number and the first segment of the IP address. The result of the hash is used as an offset from a DT base address to index into the direct table. If a given DT entry correlates to a single VPN, it is possible to point directly from the DT entry to a route in the table. The implied bit position (for IPV4) of the DT entry is 16+N (e.g. 16+12=28).

Thus, if a 16 bit prefix of longer prefixes is pointed to directly from the DT, the search engine must be enhanced to identify this route with bit position 28 to insure the longest prefix match process completes as desired. If multiple VPN numbers correlate to the same DT entry, no routes can be connected to the DT, and one or more PSCBs must completely resolve sub-trees to the extent that each is restricted to contain only routes from a single VPN. PSCB chains are constructed in accordance with previously disclosed methods relating to fixed match or exact match search trees. The last PSCB used to resolve the VPN and first 16 bits uniquely must use the 28th bit (e.g. for IPV4) as its test bit to insure the hashed part of the search key is resolved exactly prior to processing the second segment of the IP address. This may require one additional PSCB in the chain just to identify the required bit position, but may suggest an optimization to the standard method of building PSCB chain structures to choose the 28th bit as the final distinguishing bit position, rather than some previous bit position that could equally distinguish two patterns.

The dynamic route insertion/deletion process for a routing table in accordance with the subject invention must also be modified to maintain the desired table structure. According to the present invention, the following insertion policy shall be employed:

Determine DT entry correlating to new route.
If DT entry is empty, add directly to DT.
If distinguishing bit position is greater than bit 28 (this VPN already has other routes at this DT entry), insert normally.
If distinguishing bit position is bit 28 or less (new VPN for this DT entry)
  If first PSCB in place is greater than bit 28, add PSCB to resolve new VPN from existing VPN.
    Use bit 28 if distinguishing.
    Otherwise, use first distinguishing bit. Then add PSCB at bit 28 for each VPN
  If first PSCB in place is less than bit 28 (multiple VPNs already in place)
    Use bit 28 if distinguishing.
    Otherwise, use first distinguishing bit. Then add PSCB at bit 28 for new VPN (others should already have it).

Likewise, a deletion policy involves the following steps:
Determine DT entry correlating to route to be deleted.
If route to be deleted is at the DT entry, delete the route from the DT normally.

If distinguishing bit position is greater than bit 28 (this VPN has other routes at this DT entry), delete normally.

If distinguishing bit position is bit 28, or if next PSCB is with only one choice at bit 28 (other VPNs for this DT entry)

If no previous PSCBs (only one other VPN)
Remove PSCBs
Use DT entry to point directly If one or more previous PSCBs in place (multiple other VPNs)
Remove PSCB normally If distinguishing bit position has one or more subsequent PSCBs prior to the PSCB at bit 28 (more than 1 VPN left)
Remove PSCB normally.

The method of the subject invention results in faster search performance since it is able to resolve most, if not all, VPN distinctions with a single DT access rather than requiring multiple PSCBs. The invention can also use a larger direct table, further reducing the number of PSCBs required.

The invention has been described specifically within the context of IPV4 (i.e. 32 bit IP address) and VPN applications. However, it should be obvious to those skilled in the art that these concepts could be extended to other applications in which the longest prefix match (LPM) search characteristic can be limited to only part of the search key. For example, with IPV6, potentially an even longer first segment of the IP address could be hashed if the LPM characteristic were limited to the last segment of each address.

Figure 9:
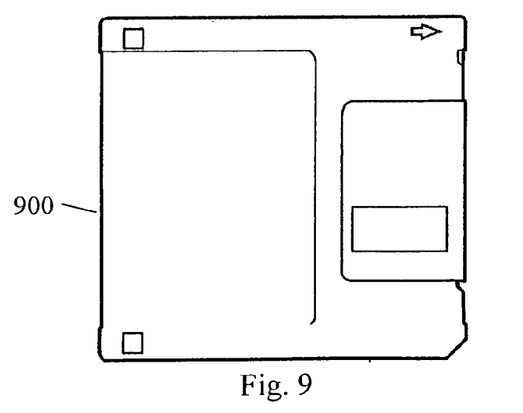
FIG. 9 shows a floppy disc, indicative of a computer-readable medium for carrying out the steps of the present invention.

FIG. 9 shows a computer-readable medium in the form of a floppy disc 900 for containing the software implementation of the program to carry out the various steps of project management according to the present invention. Other machine readable storage mediums are fixed hard drives, optical discs, magnetic tapes, semiconductor memories, such as read-only memories (ROMs), programmable (PROMs), etc. The article containing this computer readable code is utilized by executing the code directly from the storage device, or by copying the code from one storage device to another storage device, or by transmitting the code on a network for remote execution. The computer program may be loaded into the memory to configure and to run the program herein described and claimed for execution. The computer program comprises instructions which, when read and executed by the system, perform the steps necessary to execute the steps or elements of the present invention.

The present invention can be realized in hardware, software, or a combination of the two. Any kind of computer system or other apparatus adapted for carrying out the methods described herein is suited. A typical combination of hardware and software could be a general purpose computer system that, when loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program instructions or computer program in the present context mean any expression, in any language, code (i.e., code instructions) or notation, of a set of instructions intended to cause a system having an information processing capability to perform a particular function either directly or after either or both of the following occur: a) conversion to another language, code or notation; b) reproduction in a different material form.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. A method for determining a longest prefix match for a variable length search key by a computer processing device, comprising the acts of:

reading an internet protocol (IP) destination address;

reading a virtual private network (VPN) number;

performing a hash on the N most significant bits of the IP destination address and the VPN number, and concatenating the remaining least significant bits of the IP destination address to the result of the hash operation to form an input key;

using the hashed portion of the input key as an index into a table representing a plurality of root nodes of search trees wherein each non-empty entry in the table contains a pointer to a next branch in the search free or a leaf;

determining if the pointer in a non-empty table entry points to a leaf or a next branch of the corresponding search tree;

use a next-bit-to-test field in the entry to find a distinguishing bit position in the search key, and determine if that bit is a one or a zero;

responsive to the state of the identified distinguishing bit, reading either the first half or second half of the next branch contents if the pointer points to a next brunch of the corresponding search free;

storing intermediate leaf pointers and corresponding prefix length as determined by distinguishing bit position;

reading a leaf pattern when the leaf of a corresponding search tree is reached and comparing the leaf pattern with the input key to determine if the leaf pattern matches the input key;

if leaf pattern matches, identifying the leaf as the longest prefix match;

if leaf pattern does not match, identifying previously stored leaf pointer with distinguishing bit greater than least significant bit of mismatch as the longest prefix match; and returning the Longest prefix match found for the input key to a requesting application.

2. The method for determining the longest prefix march of claim 1 wherein the table contains $2^N$ entries wherein N represents the number of bits.

3. The method of claim 1 wherein VPN number has 12 bits, and N=16 bits.

4. The method of claim 1 wherein the contents of the next branch of the corresponding search free points to another next branch.

5. The method of claim 1 wherein the contents of the next branch points to a leaf of the corresponding search tree.

6. The method of claim 5 wherein the leaf represents a partial prefix match of the input key.

7. The method for determining the longest prefix match of claim 1 further comprising the act of terminating the search for the longest prefix match when the bit number of the next branch exceeds the length of the input key.

8. A method of conducting a search through a virtual private network routing table structure for at least one search tree, comprising:

performing a hash operation on a first segment of an internet protocol destination address with a virtual private network number to provide an output, and concatenating the remainder of the internet protocol destination address to the output of the hash operation to form a search key;

inputting the first segment of the search key into a direct table within the routing table structure wherein said direct table represents a plurality of root nodes of search trees; and determining a longest prefix match for a variable length search key;

further including inserting a new route into the direct table structure comprises the steps of:

determining the direct table entry correlating to the new route;

if the direct table entry is empty, adding the entry directly to the direct table;

if the distinguishing bit position is greater than bit 28, insert the entry normally;

if the distinguishing bit position is bit 28 or less:
- if the first pattern search control block (PSCB) in place is greater than bit 28, add another pattern search control block to resolve new virtual private network from existing virtual private network; and
  use bit 28 if distinguishing;
  - otherwise, use first distinguishing bit, then add a new pattern search control block at bit 28 for each virtual private network;
- if the first pattern search control block in place is less than bit 28 thus indicating that multiple virtual private networks are already in place
  use bit 28 if distinguishing; and
  - otherwise, use first distinguishing bit and then add pattern search control block at bit 28 for new virtual private network.

9. A method of conducting a search through a virtual private network routing table structure for at least one search tree, comprising:

performing a hash operation on a first segment of an internet protocol destination address with a virtual private network number to provide an output and concatenating the remainder of the internet protocol destination address to the output of the bash operation to form a search key;

inputting the first segment of the search key into a direct table within the routing table structure wherein said direct table represents a plurality of root nodes of search trees; and determining a longest prefix match for a variable length search key;

further including deleting a route from the direct table comprises the steps of:

determining the direct table entry correlating to the route to be deleted;

if the route to be deleted is at the direct table entry, delete the route from the direct table normally;

if the distinguishing bit position is greater than bit 28, delete the route normally;

if the distinguishing bit position is bit 28, or if next pattern search control block is with only one choice at bit 28;

if no previous pattern search control blocks are in place, remove the pattern search control blocks, and use the direct table entry to point directly;

if at least one previous pattern search control block is in place, remove the pattern search control block normally; and if the distinguishing bit position has one or more subsequent pattern search control blocks prior to the pattern search control block at bit 28, remove the pattern search control block normally.

* * * * *

UNITED STATES PATENT AND TRADEMARK OFFICE
CERTIFICATE OF CORRECTION

PATENT NO. : 7,089,240 B2  Page 1 of 1
APPLICATION NO. : 10/879964
DATED : August 8, 2006
INVENTOR(S) : Basso et al.

It is certified that error appears in the above-identified patent and that said Letters Patent is hereby corrected as shown below:

Please amend claim 1 as follows:

Colum 14, line 22 change "free" to --tree--
Colum 14, line 46 change "Longest" to --longest--

Please amend claim 2 as follows:

Colum 14, line 48 change "march" to --match--
Colum 14. line 54 change "free" to --tree--

Signed and Sealed this

Seventeenth Day of October, 2006

JON W. DUDAS
*Director of the United States Patent and Trademark Office*